United States Patent
Carboni et al.

(10) Patent No.: US 11,866,082 B2
(45) Date of Patent: Jan. 9, 2024

(54) MAGAZINE FOR BUNDLES OF BLANKS

(71) Applicant: AZIONARIA COSTRUZIONI MACCHINE AUTOMATICHE A.C.M.A. S.p.A., Bologna (IT)

(72) Inventors: Salvatore Carboni, Bologna (IT); Andrea Biondi, Bologna (IT); Antonio Vitali, Molinella (IT)

(73) Assignee: G.D.S.P.A., Bologna (IT)

( * ) Notice: Subject to any disclaimer, the term of this patent is extended or adjusted under 35 U.S.C. 154(b) by 222 days.

(21) Appl. No.: 17/220,390

(22) Filed: Apr. 1, 2021

(65) Prior Publication Data
US 2021/0309272 A1  Oct. 7, 2021

(30) Foreign Application Priority Data

Apr. 3, 2020 (IT) .................. 102020000007087

(51) Int. Cl.
*B62B 3/00* (2006.01)
*B62B 3/04* (2006.01)
(Continued)

(52) U.S. Cl.
CPC ............... *B62B 3/006* (2013.01); *B62B 3/04* (2013.01); *B62B 3/108* (2013.01); *B65G 1/14* (2013.01);
(Continued)

(58) Field of Classification Search
CPC ........... B62B 3/006; B62B 3/04; B62B 3/108; B62B 2203/30; B62B 2203/60; B62B 2203/72; B62B 2201/022; B62G 1/14
See application file for complete search history.

(56) References Cited

U.S. PATENT DOCUMENTS 3,231,103 A * 1/1966 Tantlinger ............... B65G 1/14
                                                    211/49.1
4,359,162 A * 11/1982 Mayer .................. B65G 1/14
                                                    312/351
(Continued)

FOREIGN PATENT DOCUMENTS

CN     107499348 A    12/2017
CN     109227500 A     1/2019
(Continued)

OTHER PUBLICATIONS

European Search Report dated Aug. 17, 2021 from counterpart European Patent Application No. 21166783.7.
(Continued)

*Primary Examiner* — Stanton L Krycinski
(74) *Attorney, Agent, or Firm* — Timothy J. Klima; SHUTTLEWORTH & INGERSOLL PLC (57) ABSTRACT

A magazine for bundles of blanks includes a vertical channel configured for inserting and extracting bundles of blanks and a succession of groups of supporting parts distributed along the channel. The supporting parts are configured to support the underside of a respective bundle of blanks. More specifically, each supporting part is movable between an extracted position, where it projects from the channel, towards the inside of the channel, to intercept a bundle that is moving down along the channel and to provide a steady support for the bundle, and a retracted position, where the supporting part is aligned or recessed with respect to the channel to allow the bundle to move along the channel towards a portion under the supporting part. The magazine also includes, for each supporting part, an actuating device configured to promote the passage of the supporting part from the retracted position to the extracted position and controllable by an operator, preferably manually.

11 Claims, 4 Drawing Sheets

(51) Int. Cl.
*B62B 3/10* (2006.01)
*B65G 1/14* (2006.01)

(52) U.S. Cl.
CPC ....... *B62B 2203/30* (2013.01); *B62B 2203/60* (2013.01); *B62B 2203/72* (2013.01); *B65G 2201/022* (2013.01)

(56) References Cited

U.S. PATENT DOCUMENTS

| | | | | |
|---|---|---|---|---|
| 4,712,691 | A * | 12/1987 | Grill | B65G 1/14 211/49.1 |
| 5,005,712 | A * | 4/1991 | Niederprum | B65G 1/14 53/244 |
| 5,411,234 | A * | 5/1995 | Schoeller | B65G 1/14 254/89 H |
| 7,347,654 | B2 * | 3/2008 | Mondejar Jimenez | B65G 1/14 410/43 |
| 9,022,371 | B2 * | 5/2015 | Seghezzi | B65G 1/14 248/304 |
| 9,199,803 | B1 * | 12/2015 | Morris | B65G 59/026 |
| 10,059,521 | B2 * | 8/2018 | Swoboda | B65G 59/101 |
| 10,807,793 | B2 * | 10/2020 | Byström | B63B 25/002 |
| 10,829,318 | B2 * | 11/2020 | Kreft | A47F 7/0014 |

FOREIGN PATENT DOCUMENTS

| | | | | |
|---|---|---|---|---|
| DE | 1122000 | B | 1/1962 | |
| DE | 1233331 | B * | 1/1967 | |
| DE | 3943559 | A1 * | 5/1991 | |
| DE | 4312214 | C1 * | 9/1994 | ............ B65G 1/14 |
| DE | 19617518 | A1 * | 11/1997 | ............ B65D 19/44 |
| DE | 29912496 | U1 * | 10/1999 | ............ B65G 1/14 |
| DE | 10300583 | A1 | 7/2004 | |
| DE | 10320566 | B3 * | 12/2004 | ............ B65G 1/14 |
| DE | 102005025813 | A1 * | 12/2006 | ............ B65G 1/14 |
| DE | 102005029120 | A1 * | 12/2006 | ............ B65D 19/44 |
| DE | 202009006071 | U1 | 7/2009 | |
| DE | 202016000929 | U1 * | 3/2016 | ............ B65G 1/14 |
| EP | 0611708 | A1 * | 8/1984 | |
| EP | 3048070 | A1 * | 7/2016 | ............ B65G 1/14 |
| GB | 1359753 | A | 7/1974 | |
| GB | 1359753 | A * | 7/1974 | ............ A47B 57/08 |
| JP | 59217509 | A * | 12/1984 | |
| JP | S61 165904 | U | 10/1986 | |
| SU | 735496 | A1 * | 5/1980 | |
| WO | WO-0168487 | A1 * | 9/2001 | ............ B65G 1/14 |
| WO | WO-2007137832 | A1 * | 12/2007 | ............ B65G 1/14 |

OTHER PUBLICATIONS

Italian Search Report dated Aug. 17, 2020 from counterpart Italian App No. 202000007087.

Italian Search Report dated Aug. 17, 2020 from counterpart Italian Patent Application No. 202000007087.

* cited by examiner

Fig.4

MAGAZINE FOR BUNDLES OF BLANKS

This invention relates to a magazine for bundles of blanks.

CROSS-REFERENCE TO A RELATED APPLICATION

This application claims priority to Italian Application No. 102020000007087 filed Apr. 3, 2020, which application is incorporated by reference herein.

By "bundle of blanks" is meant a group of blanks stacked on top of one another to form a single unit from which each blank can be withdrawn at a pickup station. The blanks may be made of cardboard, for example, although other materials may be used, depending on what the blank is going to be used for.

Magazines for containing bundles of blanks known up to the present time extend horizontally along a respective axis. These horizontal magazines usually have a cross section whose shape follows the profile of a single blank (or of a bundle of blanks). In other words, the blanks or bundles of blanks are made to slide in a channel of the magazine which extends horizontally in such a way as to define a single pile, also extending horizontally.

Disadvantageously, this type of magazine makes it difficult for the blanks or, more specifically, the bundles of blanks to be withdrawn in specific numbers or types.

What is more, the difficulty of withdrawing them can also lead to the blanks being damaged by an operator or automated handling means.

Disadvantageously, its configuration means that a magazine of this kind has a large footprint, making it problematic to install it in situations where floor space is limited.

Moreover, the position for installing a magazine of this kind is dictated by the machine it is coupled to. Consequently, prior art magazines provide a poor level of flexibility of use. This invention therefore has for an aim to provide a magazine for bundles of blanks which allows the blanks or bundles of blanks, in particular bundles of different kinds, to be extracted/inserted easily.

A further aim of the invention is to provide a magazine for bundles of blanks which requires less floor space and can thus be positioned and moved more easily within a production/storage facility.

A further aim of the invention is to provide a magazine for bundles of blanks whose structure is simple to use and maintain, as well as inexpensive in terms of production and assembly.

The technical purpose and aims specified are substantially achieved by a magazine for bundles of blanks comprising the technical features described in one or more of the appended claims. The dependent claims correspond to possible embodiments of the invention.

More specifically, the technical purpose and aims specified are substantially achieved by a magazine for bundles of blanks comprising a vertical channel, configured for inserting and extracting bundles of blanks, and a succession of groups of supporting parts spaced along a height of the channel and configured to support the underside of a respective bundle of blanks.

The supporting parts are mounted on a plurality of fixed vertical supports, specifically in the form of tubular uprights delimiting the vertical channel between them.

The supporting parts are vertically spaced at predetermined distances from each other, specifically at two or more levels (with two or more supporting parts at each level) so that each supporting part is located at a respective level of the channel to allow the bundles of blanks to be stacked one above the other.

Furthermore, the supporting parts are placed in the channel at positions such as to support the bundle of blanks at a plurality of points located along the perimeter of the bundle, for example in the zones most subject to bending or sagging. Furthermore, the number and/or position of the supporting parts of each group—that is to say, of each level—may be such as to stop the bundle so that it can be extracted from the magazine only vertically (specifically from above) and not, for example, from the side.

Operatively, each supporting part is movable between an extracted position and a retracted position, where the bundles of blanks are, respectively, supported in, or allowed to move along, the channel. More in detail, at the extracted position, the supporting part projects from an inside wall of the channel towards the inside of the channel in such a way as to intercept a bundle of blanks moving down the channel and to provide a steady support for the bundle of blanks. At the retracted position, on the other hand, the supporting part is aligned or recessed with respect to the inside wall of the channel to allow the bundles of blanks to move along the channel towards and away from a portion under the supporting part.

The magazine also comprises, for each supporting part, an actuating device configured to promote the passage of the supporting part from the retracted position to the extracted position and controllable by an operator, preferably manually.

In this situation, the supporting parts are driven to the extracted position so as to form different levels at which the bundles of blanks can be stored in a stacked condition, preferably spaced from each other in such a way as to leave a gap of predetermined size between two adjacent bundles.

Each supporting part is also movable between the extracted and the retracted position by rotation about a respective horizontal axis of rotation that is eccentric relative to the barycentre of the supporting part itself. More specifically, the axis of rotation is located at a position such that the supporting part tends to remain at the extracted position under the action of gravity and preferably also at the retracted position under the action of gravity.

Further, each supporting part can be moved automatically from the retracted position to the extracted position when a bundle of blanks below pushes it upwards while it is being extracted from the magazine.

The movement of each supporting part from the retracted position to the extracted position, on the other hand, is accomplished by means of a respective actuating device.

The actuating device is configured like a pushbutton and is provided with a pushing element which, when pressed by an operator, pushes the supporting part away from the retracted position (where it is being held in place by gravity) for a predetermined stroke length to a position (intermediate between the extracted and the retracted position) where the supporting part can continue turning spontaneously to the extracted position thanks to the action of gravity.

Preferably, the supporting part is subjected to the action of a retaining device configured to hold the supporting part at the retracted position. The retaining device is preferably configured to apply a releasable retaining action following activation of the respective actuating device.

In a preferred embodiment, the retaining device is configured to apply a magnetic force of attraction on the supporting part, the magnetic force of attraction being smaller than the pushing action of the actuating device which, when activated, overcomes the action of the retaining device.

The magazine according to the invention is especially designed for the temporary storage of blanks intended for making three-dimensional containers, especially packages for loose products for the coffee market: for example, capsules or pods. More generally speaking, the invention is applicable to the production of containers for the following sectors: food, absorbent products, ceramic ware, tobacco and pharmaceutical industries, fine quality boxes or standard boxes intended to be sold empty.

The magazine of this invention is thus manageably sized and easy to use for an operator. The magazine is also configured to be used with automated means.

Advantageously, the magazine allows avoiding damage to the packs of blanks when they are inserted and when they are extracted (whether the packs are inserted/extracted by an operator or by automated means).

The magazine according to the invention is especially designed for the temporary storage of blanks intended for making three-dimensional The invention is also suitable for storing bundles of blanks where the blanks have a complex shape, with undercuts, for example. That means, in detail, that the shape of the blanks, in plan, is not simply that of a convex polygon but has one or more lobes which give the blank a structure having at least one direction of extension and at least one protrusion extending along a direction perpendicular to the predominant direction of extension. For example, the blanks may be T-shaped or cross-shaped.

Further features of the invention and its advantages are more apparent in the non-limiting description below, with reference to a preferred embodiment of a magazine for bundles of blanks.

The description is set out below with reference to the accompanying drawings which are provided solely for purposes of illustration without restricting the scope of the invention and in which.

With reference to the accompanying drawings, the numeral 1 denotes in its entirety a magazine for bundles of blanks M which, for simplicity of description, is hereinafter called magazine 1.

By "bundle of blanks M" is meant a group or pack of blanks simply resting on top of one another to form a single unit.

The term "blanks" is used to mean pieces of foldable material—for example, cardboard, cellulose, plastic or other materials—obtained by blanking or other similar process applied to a sheet or continuous web.

The magazine 1 comprises a vertical channel 2 configured for inserting and extracting bundles of blanks M through a top opening 2a of the channel 2.

Advantageously, the vertical structure allows obtaining a manageably sized, yet particularly capacious magazine 1.

Also, the channel 2, in cross section has substantially the same shape as the blank (that is, of the bundle of blanks M) to be stored. The top opening 2a thus has the same shape as the cross section of the channel 2 so that the bundles of blanks M can move up and down along the channel 2 without undergoing deformation or bending/sagging.

Figure 1:
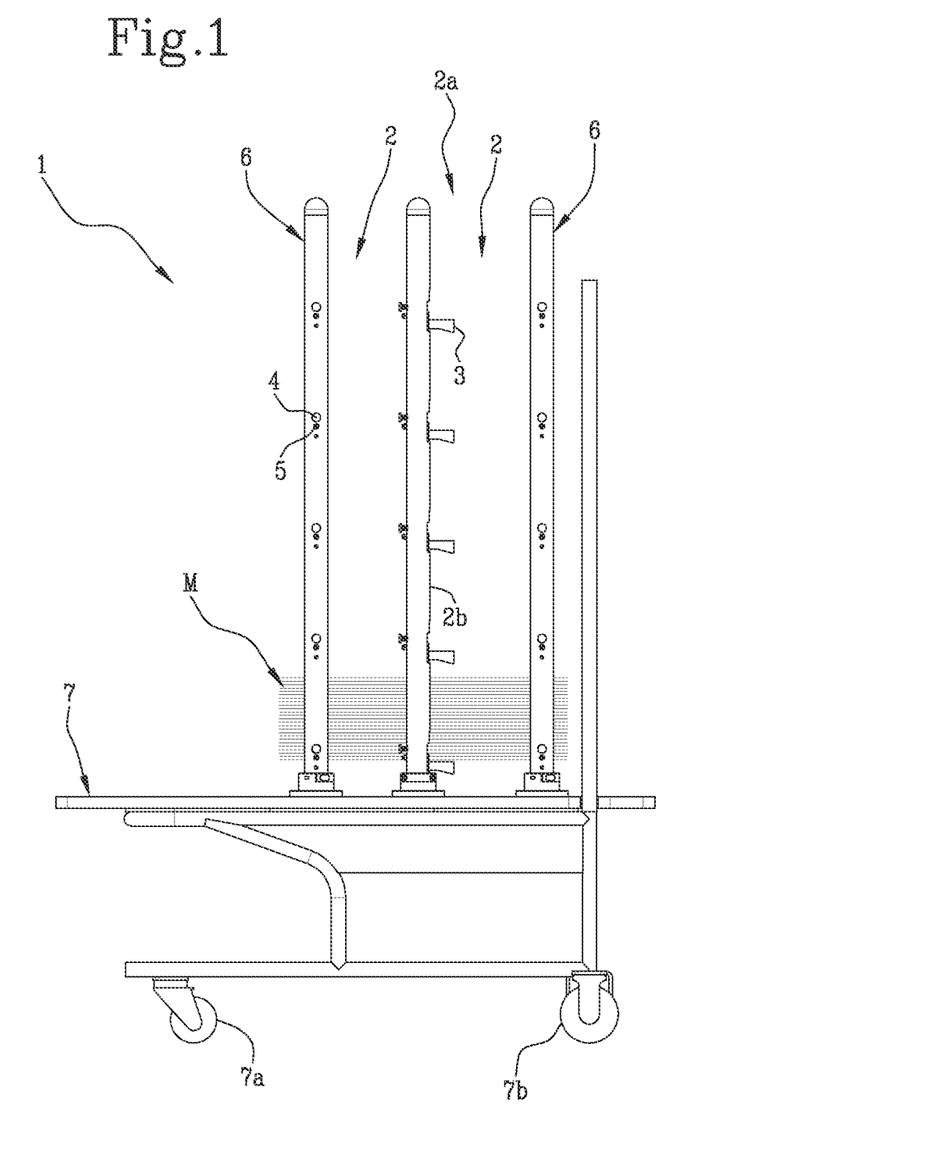
FIG. 1 is a side view of the magazine of this invention.

FIG. 1 shows a first embodiment of the magazine 1 configured to define a single channel 2 delimited by a plurality of vertical supports 6 disposed along the perimeter of the channel 2 and having a vertical inside wall 2b delimiting part of the channel 2 itself. More specifically, the main body of the magazine 1 is, in this case, defined by tubular uprights which are located to substantially follow the perimeter of the blank (or bundle of blanks S) to allow them to be stored.

Figure 4:
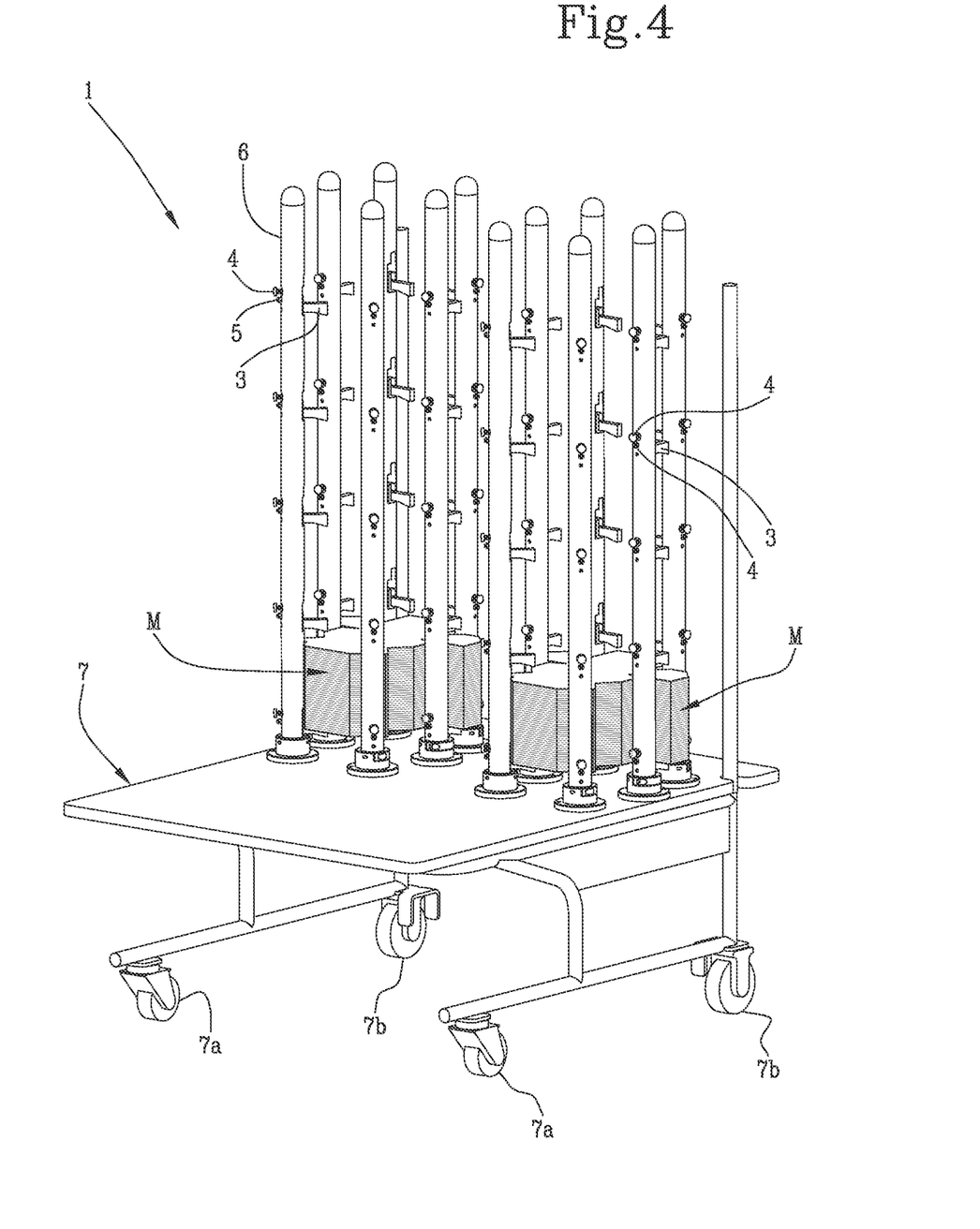
FIG. 4 shows a perspective view of a further embodiment of the magazine of this invention.

FIG. 4 shows a variant embodiment of the magazine 1 in which there are two distinct groups of vertical supports 6, each configured to define a respective channel 2 where respective bundles of blanks M are inserted/extracted. In this situation, the vertical supports 6 belonging to each group are positioned to follow the perimeter of the bundle of blanks M to be received. More specifically, in the embodiment shown in FIG. 4, the channels 2 have the same number of vertical supports 6, arranged in the same way, since both of the channels 2 receive bundles of blanks of the same shape and size.

In another possible embodiment, not illustrated, the vertical supports 6 may be positioned in such a way as to define a first channel 2, configured to allow storing large-sized bundles of blanks M, and a second channel 2, configured, instead, to receive smaller-sized bundles of blanks M.

Generally speaking, therefore, depending on the number and position of the vertical supports 6, the magazine 1 may comprise more than one channel 2 of different shapes and sizes to receive respective pluralities of bundles M of different shapes and sizes.

The magazine 1 also comprises a succession of groups of supporting parts 3 distributed along the height of the channel 2. More specifically, the supporting parts 3 are spaced at predetermined distances from each other, so that each supporting part 3 is located at a respective level of the channel 2 to support a respective bundle of blanks M from below.

Preferably, the supporting parts 3 are vertically spaced at predetermined distances from each other so that between two bundles of blanks M in the channel 2 there is a gap in the vertical direction such as to prevent contact between the bundles of blanks M and to allow inserting lifting fingers of an automatic extracting device (not illustrated) or other lifting systems, for example, manual lifting systems.

Figure 2A:
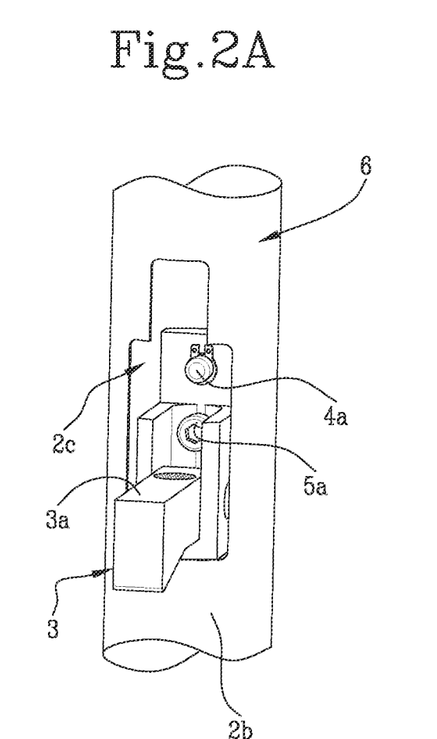
FIGS. 2A, 2B and 2C show a detail of the magazine of FIG. 1.
Figure 2B:
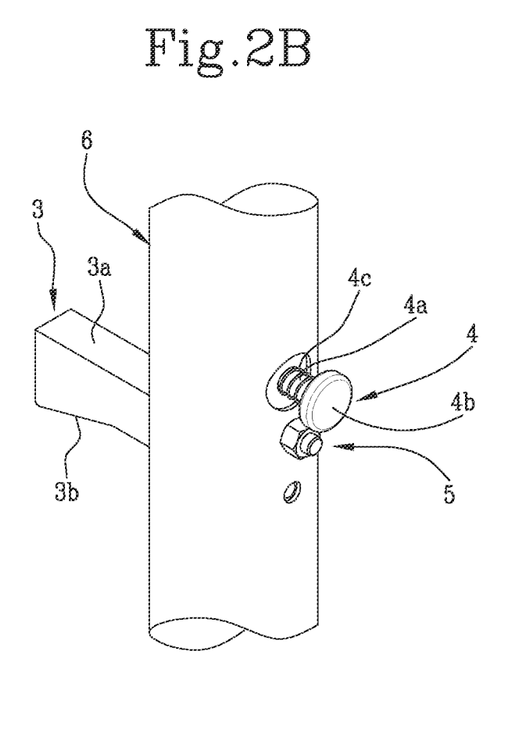
Figure 2C:
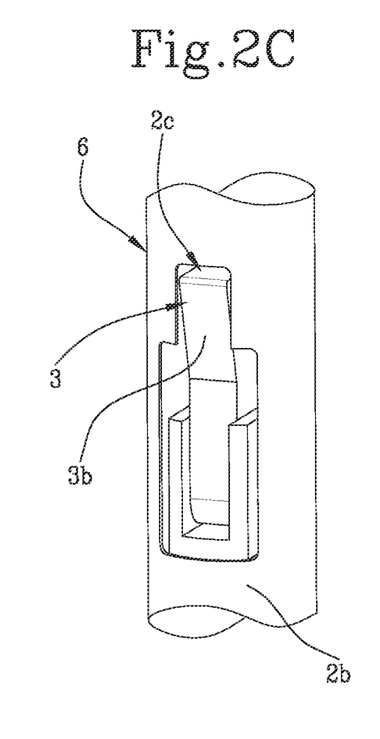
Figure 3:
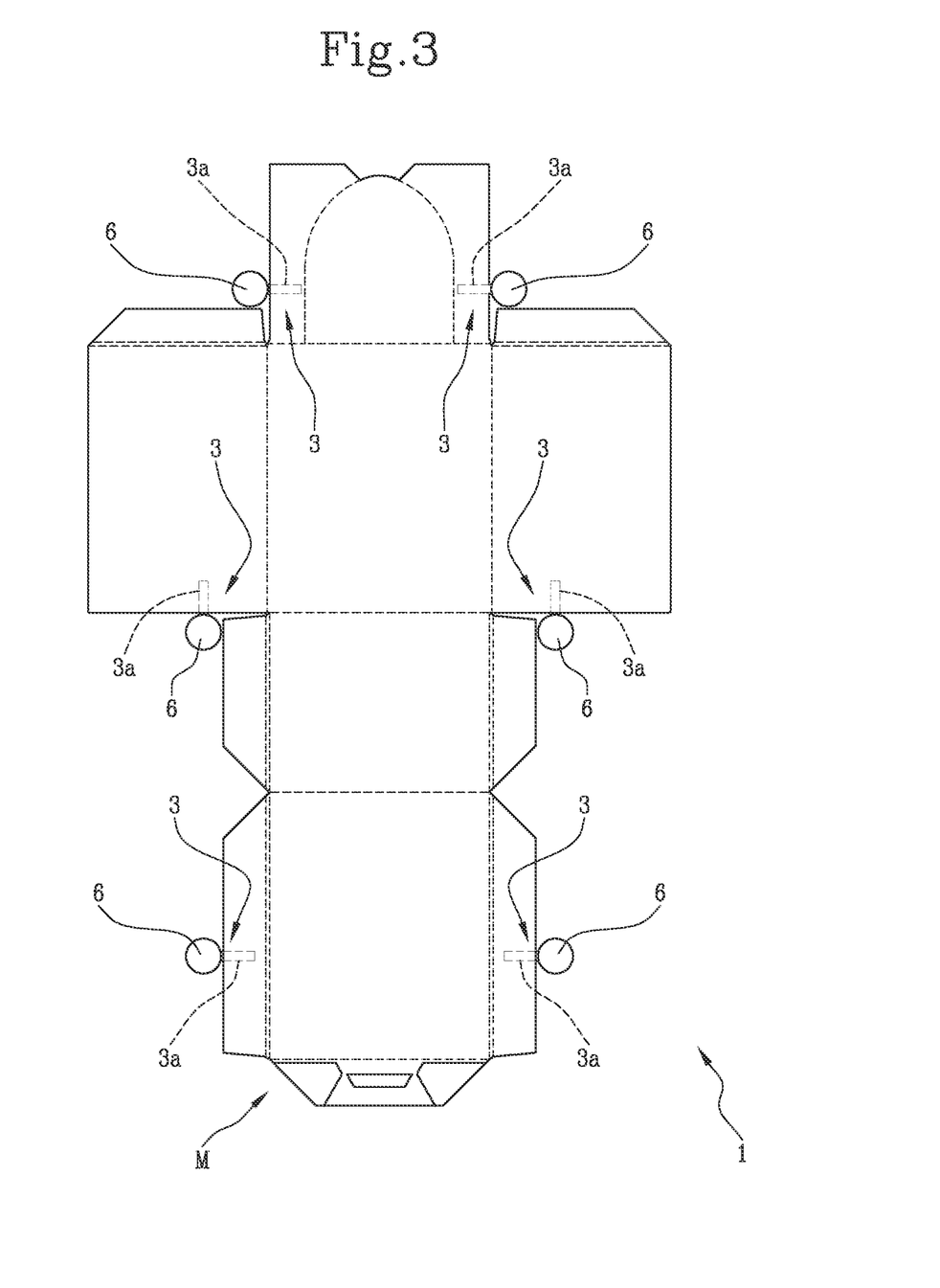
FIG. 3 shows a plan view of the magazine of this invention.

As shown in FIGS. 2A, 2C, each supporting part 3 is movable between a retracted position (FIG. 2C) and an extracted position (FIG. 2A).

By "retracted position" is meant a position of the supporting part 3 at which it is aligned or recessed with respect to an inside wall 2b of the channel 2 to allow the bundles of blanks M to move along the channel 2 towards a portion under/above the supporting part 3.

More generally speaking, therefore, the supporting part 3 is at a retracted position when a bundle of blanks M, as it moves up or down the channel 2, needs to move past in proximity to the supporting part 3 without being intercepted and stopped.

Preferably, as shown in detail in FIG. 2C, the inside wall 2b of the channel 2 is provided with suitable grooves 2c, or recesses, each configured to accommodate a respective supporting part 3 at the retracted position so as to allow the bundles of blanks M to move freely up or down along the channel 2.

By extracted position, on the other hand, is meant a position at which the supporting part 3 projects from the inside wall 2b towards the inside of the channel 2, preferably in a substantially horizontal direction, in such a way as to intercept a bundle of blanks M moving down the channel 2 and to provide a steady support for the bundle of blanks M.

Preferably, the supporting part 3 is at the extracted position when it is substantially perpendicular to the corresponding vertical support 6. At that position, the supporting part 3 faces towards the top opening 2a of the channel 2 with a supporting portion 3a of it that is preferably flat and configured to form a stable support for a respective bundle of blanks M moving upwards along the channel 2.

As shown in detail in FIG. 2B, the magazine 1 is also provided, for each supporting part 3, with an actuating device 4, controllable by an operator, preferably manually, and configured to promote the passage of the supporting part 3 from the retracted position to the extracted position.

Preferably, each actuating device 4 is operable independently so that each supporting part 3 passes from the retracted position to the extracted position independently of the other supporting parts 3, as described better below.

As illustrated in FIGS. 2A and 2B, the actuating device is located in a housing formed in a wall opposite the inside wall 2b of the channel 2 and comprises a pusher 4a with a head 4b made like a pushbutton which the operator can press.

Looking in more detail, the pusher 4a is movable between an advanced position, at which the pusher 4a pushes or impacts against the supporting part 3 to push the supporting part 3 towards the extracted position, and a withdrawn position, at which the pusher 4a allows the supporting part 3 to adopt the retracted position.

Preferably, the actuating device 4 also comprises an opposing spring 4c operating on each pusher 4a to hold the pusher 4a at its withdrawn position.

Preferably, the actuating device 4 also comprises a stop element, for example, a snap ring, configured to define a limit stop to the withdrawing movement of the pusher 4a.

In use, therefore, when the magazine 1 receives a bundle of blanks M, the operator presses the pushbuttons 4b associated with the supporting parts 3 located at the level of the channel 2 where the bundle of blanks M is to be placed. The operator's action causes the pushers 4a to move from the withdrawn position to the advanced position by pushing or impacting against the supporting parts 3 in such a way as to push them out of the respective grooves 2c. The supporting parts 3 thus pass from the retracted position to the extracted position projecting towards the inside of the channel 2 so as to receive on its supporting portion 3a the bundle of blanks M entering the magazine 1.

Preferably, each supporting part 3 is movable between the retracted position and the extracted position (and vice versa) by a passive rotational movement about a horizontal axis under the action of its own weight.

More specifically, the barycentre of each supporting part 3 is located at a position such that the rotational movement from the retracted position and the extracted position is caused by gravity, thereby allowing the supporting parts 3 to move to the extracted position quickly and easily. In other words, when a supporting part 3 is actuated by a pusher 4a, the supporting part 3 automatically urged into the extracted position.

Advantageously, the tendency of the supporting part 3 to move automatically to the extracted position prevents the supporting part 3, as it turns after being actuated by the pusher 4a, from sticking at an intermediate position between the retracted position and the extracted position where it would damage the bundle of blanks M by unwanted scraping and/or bending as it enters the magazine 1.

Operatively, the magazine 1 of this invention is filled from the levels at bottom of the channel 2 to the level closest to the top opening 2a of the channel, according to LIFO logic.

Each time a level is filled with a respective bundle of blanks M, the operator actuates the supporting parts 3 of the level just above until the magazine is full to capacity or to a desired level.

During this operation, the operator preferably fills all the levels, without leaving any of them empty. This is important because the supporting parts 3 of each level (for example, level 4) are moved automatically to the retracted position by the group of articles S just below them (for example, at level 3) while they are being extracted. If there is no group of articles S at that level, there would be nothing to push the supporting parts 3 to the retracted position and thus, when the pickup head next makes a movement to pick up a group of articles S further down, (for example, at level 2), it would probably collide with the supporting parts 3 that have remained at the advanced position, with the risk of damaging the supporting parts 3 and the pickup head.

When the magazine 1 is emptied, on the other hand, the bundles of blanks M are extracted from the level closest to the top opening 2a of the channel 2 down to the level furthest from the top opening 2a.

During operations in which the bundles of blanks M are picked up from the magazine 1, the supporting parts 3 located at one level of the channel 2 passively receive a return movement towards the retracted position as a result of direct contact with the bundle of blanks M moving upwards along the channel 2 from under them.

To facilitate the return of the supporting parts 3 from the extracted position to the retracted position, the supporting parts 3 have a bar-like structure comprising an abutment portion 3b, opposite to the supporting portion 3a, configured to interact with the bundle of blanks M moving upwards along the channel 2.

Preferably, the abutment portion 3b is shaped to have a first stretch that extends in parallel with the supporting portion 3a and a second stretch, at the end of it (that is, defining its free end) that is at an angle to the first stretch and is configured to remain in contact with the bundle M moving up the channel 2 until the supporting part 3 reaches the retracted position. In other words, the free end of each supporting part 3, opposite the axis of rotation, has a trapezoidal shape, with lower vertex projecting downwardly.

To further facilitate the supporting parts 3 reaching the retracted position and/or to help keep them there, the magazine 1 comprises a retaining device 5 for each supporting part 3.

Preferably, the retaining device 5 comprises a magnetic coupling to apply a magnetic force of attraction between the supporting part 3 and the respective pusher 4a or a fixed abutment 5a.

In the embodiment illustrated in FIGS. 2A and 2B, the retaining device 5 is made in the form of a fixed abutment 5a positioned adjacent to the actuating device 4, for example, under it, so as to apply the magnetic force of attraction on a corresponding portion of the supporting part 3, specifically a portion closer to the vertical support 6.

In other words, when the magazine 1 is being emptied, the supporting part 3 is simultaneously pushed towards the retracted position by the bundle of blanks M moving up along the channel 2 and attracted towards the retracted position by the retaining device 5.

To move the supporting parts 3 back to the extracted position so that more bundles of blanks M can be placed in the magazine 1 after it has been totally or partly emptied, the pusher 4a must apply on the supporting part 3 an impulsive force that can overcome the magnetic force of attraction applied by the retaining device 5.

Advantageously, the combined action deriving from the upward motion of the bundle M and the retaining device 5 prevents the supporting parts 3 from accidentally passing from the retracted position to the extracted position, thus preventing the supporting parts 3 from being incorrectly positioned at the extracted position, where they would hinder the movement of the bundles of blanks M along the channel 2.

Advantageously, the application of a magnetic force of attraction prevents the supporting parts 3 from wavering between the extracted position and the retracted position (or vice versa) when the magazine 1 is moved: this prevents the risk of the supporting parts 3 breaking or being snapped off the vertical supports 6.

In another possible embodiment, not illustrated, the magnetic force of attraction might be applied directly between the supporting part 3 and the pusher 4a, without the need for a specific device.

According to another aspect of the invention, the magazine 1 may be mounted on a trolley or, more generally speaking, a movement device configured for moving the magazine 1 within a building/storage facility.

According to this aspect of the invention, the magazine 1 may be provided with a base panel 7 on which the vertical supports 6 defining the channel 2 are mounted.

As shown in the accompanying drawings, the base panel 7 may itself be equipped with the movement means to make the magazine 1 movable or self-propelled within a building/storage facility.

Preferably, the panel 7 has two front wheels 7a and two rear wheels 7b. In an embodiment, two of the wheels (specifically, the front wheels 7a) are steerable wheels to turn the magazine 1 in different directions, while the other two wheels (the rear wheels 7b) are not steerable.

In another variant embodiment, not illustrated, the panel 7b might be mounted, for example, on rails, guides, slideways or the like.

In another variant embodiment, the panel 7b might be moved by automated movement means which do not require the presence or the action of an operator.

In an embodiment, the vertical supports 6 are applied to the base panel 7 permanently, for example, fixedly by means of screws or other fastening elements.

In another embodiment, the vertical supports 6 are mounted on the base panel 7 by an adjustment system along two horizontal, preferably perpendicular axes, allowing the position of each vertical support 6 to be adjusted independently so that the shape and/or size of the channel 2 can be adapted to the format of the bundles to be contained (and, in particular, to the shape of the blanks in plan), thus making the magazine extremely flexible.

Advantageously, the magazine 1 is easy to move even when the channel 2 is completely full at all its levels.

The possibility of moving the magazine 1 manually or automatically makes the magazine 1 particularly suitable for interacting with other machines, such as, for example, automatic machines for filling/emptying it.

The invention achieves the proposed aims by eliminating the drawbacks of the prior art.

More specifically, the magazine 1 of this invention makes operations for inserting and extracting the bundles of blanks M quick and easy.

The mechanisms for moving and actuating the supporting parts 3 are simple and therefore inexpensive in terms of production and maintenance.

The mechanisms for moving and actuating the supporting parts 3 are also reliable and economical.

The vertical structure of the magazine 1 considerably reduces its footprint, making it versatile and easy to position in any building.

Advantageously, the magazine 1 is easy to use both by an operator and in an automated handling system.

Advantageously, the magazine 1 allows avoiding damage to the different bundles of blanks M when they are inserted and when they are extracted.

The invention claimed is:

1. A magazine for bundles of blanks, comprising:
a vertical channel configured for inserting and extracting bundles of blanks through a top opening of the vertical channel;
a succession of groups of supporting parts spaced along a height of the vertical channel at predetermined distances from each other, so that each of the supporting parts is located at a respective level of the vertical channel to support an underside of a respective bundle of blanks, each of the supporting parts being movable between an extracted position, in which the supporting part projects from an inside wall of the vertical channel towards an inside of the vertical channel to intercept the respective bundle of blanks moving down the vertical channel and to provide a steady support for the respective bundle of blanks, and a retracted position in which the supporting part is aligned or recessed with respect to the inside wall of the vertical channel to allow the respective bundle of blanks to move along the vertical channel towards a portion under the supporting part;
for each of the supporting parts, an actuating device configured to promote passage of the supporting part from the retracted position to the extracted position and controllable by an operator;
for each of the supporting parts, a retaining device configured to promote holding the supporting part at the retracted position;
wherein the retaining device comprises a magnetic coupling to apply a magnetic force of attraction between the supporting part and a pusher or a fixed abutment, the pusher being configured to apply an impulsive force on the supporting part to overcome the magnetic force of attraction.

2. The magazine according to claim 1, wherein each of the supporting parts is operatively coupled with a respective one of the actuating devices and operable independently.

3. The magazine according to claim 1, wherein the pusher is a pushbutton pusher operable by an operator and movable between an advanced position, in which the pushbutton pusher impacts the supporting part to push the supporting part towards the extracted position, and a withdrawn position, in which the pushbutton pusher allows the supporting part to adopt the retracted position.

4. The magazine according to claim 3, wherein the actuating device also comprises an opposing spring operating on each pushbutton pusher to hold the pushbutton pusher at the withdrawn position.

5. The magazine according to claim 1, wherein the supporting part is movable in rotation about a horizontal axis from the retracted position to the extracted position and vice versa.

6. The magazine according to claim 1, wherein each of the supporting parts is configured to passively receive a return movement towards the retracted position following an impact of the supporting part against the respective bundle of blanks located below the supporting part and moving upwards along the vertical channel.

7. The magazine according to claim 1, wherein the vertical channel is delimited by a plurality of vertical supports disposed along a perimeter of the vertical channel, each of the vertical supports having a vertical inside wall delimiting part of the vertical channel and along which a plurality of the supporting parts are disposed.

8. The magazine according to claim 7, wherein the vertical supports are formed as tubular uprights.

9. The magazine according to claim 7, and further comprising a base panel on which the vertical supports are applied, the base panel including wheels to facilitate movement of the magazine.

10. A method for using a magazine, comprising the following steps:
providing a magazine for bundles of blanks, comprising:
a vertical channel configured for inserting and extracting bundles of blanks through a top opening of the vertical channel;
a succession of groups of supporting parts spaced along a height of the vertical channel at predetermined distances from each other, so that each of the supporting parts is located at a respective level of the vertical channel to support an underside of a respective bundle of blanks, each of the supporting parts being movable between an extracted position, in which the supporting part projects from an inside wall of the vertical channel towards an inside of the vertical channel to intercept the respective bundle of blanks moving down the vertical channel and to provide a steady support for the respective bundle of blanks, and a retracted position in which the supporting part is aligned or recessed with respect to the inside wall of the vertical channel to allow the respective bundle of blanks to move along the vertical channel towards a portion under the supporting part;
for each of the supporting parts, an actuating device configured to promote passage of the supporting part from the retracted position to the extracted position and controllable by an operator;
for each of the supporting parts, a retaining device configured to promote holding the supporting part at the retracted position;
wherein the retaining device comprises a magnetic coupling to apply a magnetic force of attraction between the supporting part and a pusher or a fixed abutment, the pusher being configured to apply an impulsive force on the supporting part to overcome the magnetic force of attraction;
A) preparing the magazine in an empty configuration and wherein all the supporting parts, except a first, lowermost level, are disposed at the retracted position, while the supporting parts of the first, lowermost level are disposed at the extracted position;
B) inserting a first bundle of the bundles of blanks into the vertical channel from above so as to rest the first bundle on the supporting parts of the first, lowermost level;
C) operating on the supporting parts of a second level, just above the first, lowermost level, so as to place the supporting parts at the extracted position;
D) inserting a second bundle of the bundles of blanks into the vertical channel from above so as to rest the second bundle on the supporting parts of the second level;
repeating steps C) and D) until a required number of the bundles of blanks has been inserted into the vertical channel.

11. The magazine according to claim 5, wherein the supporting part is shaped as a substantially straight bar.

* * * * *